Dec. 14, 1926.
E. L. KELLAN
FLUSH VALVE
Filed April 26, 1922
1,610,683
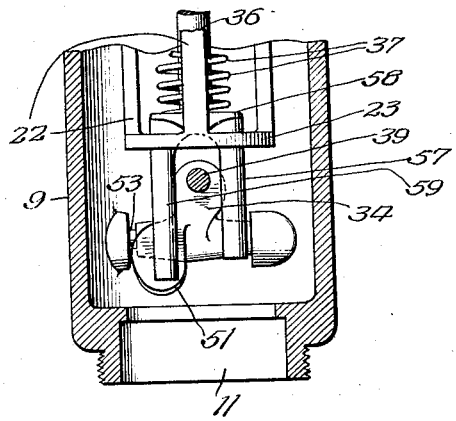
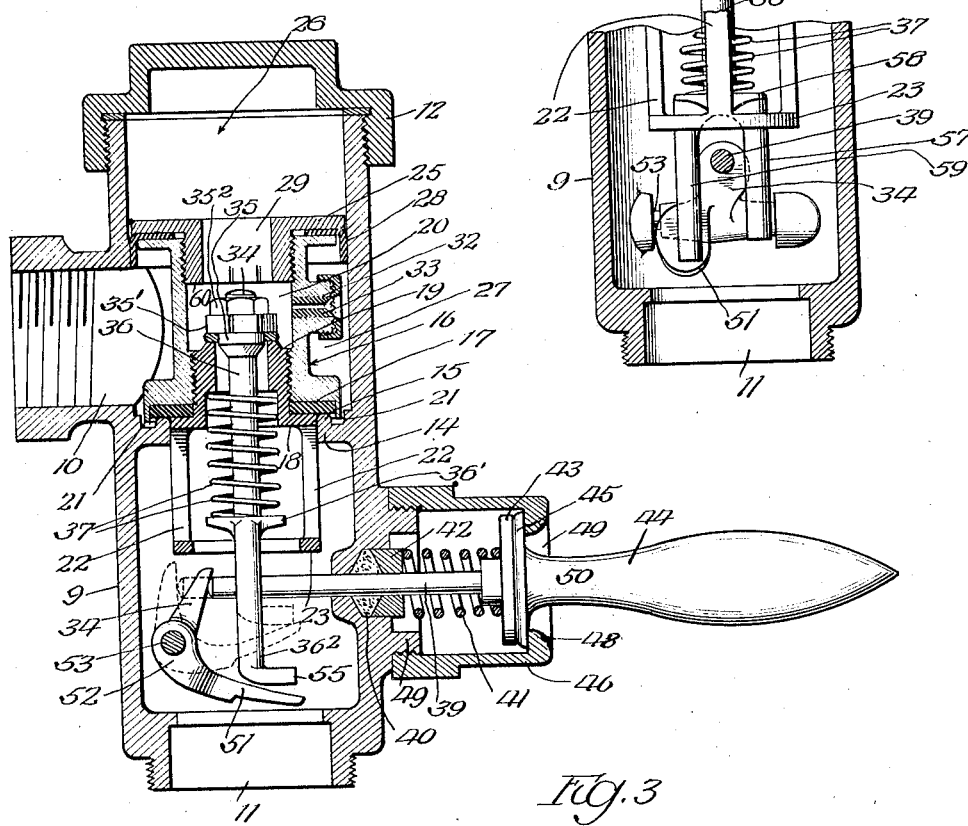
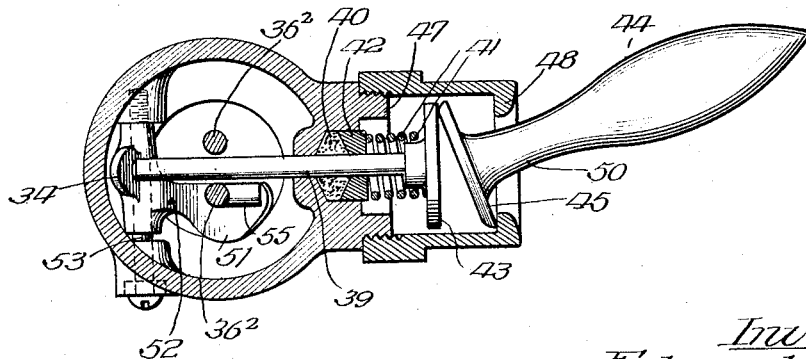
Inventor
Edward L. Kellan
By William L. Hall
Atty Patented Dec. 14, 1926.

1,610,683

UNITED STATES PATENT OFFICE.

EDWARD L. KELLAN, OF CHICAGO, ILLINOIS.

FLUSH VALVE.

Application filed April 26, 1922. Serial No. 556,575.

This invention relates to improvements in flush valve devices for supplying a desired volume of liquid for a place or places where the liquid is to be used through a desired interval of time from a source of liquid supply under pressure.

The present invention relates to that type of valve device commonly known as semi-automatic, wherein the valve is opened for the flow of liquid therethrough by the instrumentality of a manually operable device, and is closed through the action of differential pressures on the operative valve parts.

The valve device herein shown is of that type wherein the main valve is normally held on its seat by the pressure of the liquid at the inlet side of the valve, and there is provided an auxiliary or starting valve which is so constructed and arranged, with respect to the main valve, that when the auxiliary valve is opened it causes the inlet pressure, which normally holds the main valve closed, to become active to open the main valve to afford communication between the inlet and outlet sides of said valve, the main valve being closed, after closing of the auxiliary valve, by by-passing water from one side to the other of the main valve, so that the inlet pressure automatically seats the main valve after a predetermined period of liquid flow through the valve.

An object of the invention is to simplify devices of this character whereby the cost of manufacture and material can be reduced and the valve made very compact.

A further object of the invention is to provide means to drain the valve when the valve is to be cut off from the source of fluid during cold weather or at other times.

A further object of the invention is to provide means for adapting the valve to operate to produce substantially the same outflow volume of liquid for different inlet pressure, or for varying duration of outflow under the same pressures.

A further object of the invention is to provide in valves of this class a novel by-pass between the valve inlet and control cylinder which decreases liability of clogging of the by-pass.

Another object of the invention is to provide a construction which will facilitate the assemblage and dismantling of the valve elements and control means therefor.

Other objects of the invention are to further improve and simplify valve devices of this general character, and the invention consists in the combination and arrangement of the parts described in the specification and illustrated in the drawings, and is pointed out in the appended claims.

In the drawings, Figure 1 is an axial view, with parts in elevation, of a valve embodying my invention.

Figure 2 is a horizontal section on the line 2—2 of Figure 1 showing parts in different positions.

Figure 3 is a partial section of the valve similar to Figure 1, showing a modification.

As shown in the drawing, 9 designates the body or case of the valve. It is provided between its ends with an inlet branch 10, and at its lower end with an outlet branch 11, to which delivery and outlet pipes, respectively, are adapted to be connected. The upper end of the casing is exteriorly threaded to receive a cap 12, there being a packing ring interposed between the upper open end of the casing and said cap. The casing is provided near its inlet branch with an internal annular flange 14, having at its side an upstanding lip 15 to constitute a body seat. 16 designates, as a whole, the main valve, which has a seating face, preferably formed on a disc 17, of suitable yielding material that directly engages the body seat. The said disc is shown as confined between the lower portion of the valve body and a flange 18 which latter fits within the body seat but loosely enough to provide for after fill. Said flange is provided with an external threaded hollow stem 19 that extends upwardly into a neck 20 which neck is carried by or made integral with the main valve, the neck being threaded to engage the threads of the hollow stem to thereby lock the said disc 17 between the flange 18 and the valve body. The valve body is formed with a depending annular lip 21 to prevent the disc from spreading under seating pressure, and said lip operates in a reduced bore in the casing exterior to the seat to slow down the outflow before the main valve is fully seated.

A guide cage comprising the members 22 and 23 is shown as forming a part of or attached to the flange 18 and depends therefrom. Carried by the upper end of the neck 20 is a flat motor piston 25 that is of larger diameter than the main valve and fits slidingly within a cylinder formed by the upper end of the casing. Said piston divides the casing into upper and lower pressure chambers 26, 27, respectively, the latter connected directly to the inlet branch 10. The packing 28 carried by the piston 25 prevents leakage of liquid from one of said pressure chambers to the other. The piston 25 is provided with a central opening 29 which is in communication with the conduit of the hollow neck.

The upper pressure chamber 26 communicates with the inlet side of the valve through a by-pass 32 which is shown as formed in a nipple 33 that may be integral with and extends laterally from the neck 20 and in communication with the interior of the latter. Said nipple terminates short of the inner wall of the casing and radially inside the periphery of the piston 25, and the wall of the chamber is unobstructed so that the unit embracing the main valve and piston can be readily placed in and removed from the casing. The by-pass is, therefore, in free communication with the inlet side of the valve in all positions of the main valve.

In accordance with one feature of my invention, the by-pass, which is of minute diameter, is formed, in a non-corrodible material 34, of such character, as lead or tin, that it can be fused or otherwise integrally fixed to the wall of the member in which the by-pass is formed, so that the said lining becomes an integral part of the metal carrying by-pass device. The metal in which the by-pass is formed is brass, and lead or tin will readily unite thereunder. An advantage of making a by-pass of this character is that it does not become corroded by contact of water having acid or other corroding material content. Not only is the by-pass thus prevented from corroding but, being smooth and neutral to such corroding substances, it will not tend to become roughened and thereby catch minute particles of dirt, sand, or the like, found in the water, and thereby become clogged. An advantage of a by-pass surrounded by an integral lining of this character makes it possible to use the valve in sections where, heretofore, a valve having a by-pass of this character has been subjected to criticism by reason of the clogging of the by-pass due to the corrosion of its wall. Preferably a screen extends across the by-pass to prevent the liability of entrance of relatively large solid particles being carried into the by-pass.

The hollow stem 19 is formed at its upper end to provide an annular seat which is engaged by an auxiliary valve 35 carried by the upper end of a valve stem 36, which latter extends downwardly through the hollow stem 19 and the main valve and through the cage 22, 23. The auxiliary valve is formed with a compressible seat fixed between a shoulder on said stem 36 and a washer $35^1$ borne against by a nut $35^2$ threaded to the upper end of the stem 36. The said stem 36 terminates at its lower end in a pair of laterally spaced parallel legs $36^2$ joined to the auxiliary valve stem by a cross member or disc $36^1$. Said axial valve 35 is normally pressed on its seat by the expansion of a spring 37 which surrounds said stem and is interposed between an internal shoulder on the member 19 and said cross member or disc on the stem from which the arms depend.

Said auxiliary valve 35 when shifted off its seat permits the passage of liquid from the upper pressure chamber 26 through the opening 29 in the piston 25, the hollow neck and the hollow stem 19, to the outlet side of the valve. This temporarily reduces the pressure above the piston 25 to cause the maintained inlet pressure to act on the under side of the piston 25 to open the main valve. When the relief or auxiliary valve 35 is again seated the main valve will close in a period of time due to the flow rate of liquid through the by-pass, said by-pass, when the axial valve is seated, always affording communication between the inlet and the upper pressure chamber 26.

The auxiliary valve is unseated by means made as follows:

39 designates a horizontal axial displaceable plunger that extends through a stuffing box 40 in the wall of the valve casing below the guide cage. It is normally held extended axially towards the outer end of its stroke by a spring 41 that bears at its inner end against a gland 42 of the stuffing box, and at its outer end against an enlarged head 43 on the outer end of the plunger 39. 44 designates a hand piece that is formed at its inner end with a head 45 inwardly flattened to bear against the outer flattened face of the head 43. An abutment is formed for the head 45 by the outer wall 48 of a housing 46 that is threaded to a nipple 49 which extends laterally from the casing. The housing thus encloses the outer end of the plunger 39 and its controlling spring. The said end wall 48 of the housing has an opening 49 to receive the restricted neck portion 50 of the hand piece 44 exterior to its head 45. The head 45 of said hand piece normally bears at its outer face against the inner face of the end wall 48, and at its inner flat face against the contiguous face of the head 43 of the plunger 39. The parts are thus normally held in this position by the action of the spring 41.

When the hand piece 44 is pushed axially forwardly or is swung in any direction, which it is capable of doing, the said plunger 39 will be moved axially forwardly. Tilting movement of the hand piece will shift its head at such angle relatively to the wall 48 of the housing 46 as to force the head 43 of the plunger 39 inwardly, due to limited angular contact between the heads.

Operative connections between the plunger 39 and the auxiliary valve to open the latter are made as follows:

52 designates a bell crank lever which is pivoted at 53 to the casing wall. One arm 51 of said lever lies generally horizontally beneath the axis of the auxiliary valve stem 36. The other arm 34 of said bell crank lever is arranged in a generally vertical position to be engaged by the end of the plunger 39 when the latter is moved axially towards said lever. The arm 51 of said bell crank lever is made of such lateral width as to engage one of the legs of the forked auxiliary valve stem 36; and when one of said legs is thus engaged with or resting on said arm 51, the other leg is out of the vertical plane of said latter arm. Therefore, when the plunger 39 is shifted endwise inwardly by axial or angular movement of the hand piece 44, the engagement of the inner end of the plunger 39 serves to swing the bell crank lever on its pivot 53 and to cause the arm 51 of said lever to be raised. When said arm 51 of the bell crank lever is thus raised, it engages one of the legs $36^2$ of the forked auxiliary valve stem and, therefore, raises the auxiliary valve 35 from its seat to permit communication between the upper pressure chamber 26 and the outlet side of the valve, so as to cause the main valve to be lifted and to allow liquid to flow from the inlet to the outlet side of the valve until after the auxiliary valve is seated and superior pressure of the inlet side of the valve is transmitted through the by-pass to close said main valve.

In accordance with one phase of the invention, one of the legs $36^2$ of the auxiliary valve stem is provided at its lower end with a lateral extension or foot 55, which is disposed in a direction generally parallel to the lower arm 51 of the bell crank lever 52. The effect of this extension foot 55 is to vary the effective length of the bell crank lever arm 51 relatively to its lifting effect on the valve stem 36 and valve 35, so as to cause said auxiliary valve to be raised higher in a given stroke of the plunger 39 than if the said arm of the bell crank lever were engaged with the plane end of the other leg of the forked stem of the auxiliary valve. This construction results in a quicker and fuller opening of the auxiliary valve and, therefore, provides means for varying the time and area of the opening of said auxiliary valve and the main valve to correspond with different liquid pressures under which the valve may be used. The assembled unit, embracing the main valve, its neck and stem, and the auxiliary valve, can be readily removed upwardly out of the casing when the cap 12 is removed, and by angularly turning the unit 180 degrees either one of the legs of the forked auxiliary valve stem may be presented in the plane, and to the action of the lower arm 51 of said bell crank lever.

This same result may be secured by the construction illustrated in Figure 3, wherein one of the legs 57 of the forked valve stem 58 is made shorter than the other leg 59. In this latter construction, when the shorter leg of said auxiliary valve stem is in the plane of the lower arm 51 of the bell crank lever, it will not be engaged to lift the auxiliary valve until the said lever arm has moved through an initial part of its throw. When the auxiliary valve stem of the latter construction is turned to bring the longer leg in the plane of the lower arm of the bell crank lever, said auxiliary valve will be lifted more promptly upon the movement of the bell crank lever and afford a quicker and larger opening of the auxiliary valve and a corresponding modification of movement of the main valve.

It will be understood that in both constructions the leg of the auxiliary valve which is in the plane of the arm 51 of the bell crank lever 52 need not rest on said arm, when the valve is in its closed position, inasmuch as the auxiliary valve and its stem will be supported by the seat for the auxiliary valve, said auxiliary valve being held against the seat by the action of the spring 37.

By reason of the construction shown, wherein the piston 25 is made flat on its upper surface, and by reason of the further fact that the neck 20 which connects the main valve and piston can be made short, it will be observed that the casing 10 may be materially shortened while providing for an ample opening movement of the main valve. With this construction it will be noted that should the main valve tend to stick on its seat and not be promptly opened by differential pressures on the upper and lower sides of the valve or by compression of the spring 37, the complete throw of the auxiliary valve can be made such as to cause the latter to engage an internal shoulder constituted by the lower end 60 of the threaded flange of the top plate of the piston 25 and thereby lift the main valve.

By reason of the fact that the upper, apertured face of the piston is flat all of the water can be drained from the upper pressure chamber 26, at a time when the inlet pipe is closed, by merely lifting the auxiliary valve steam, through the hand piece 44, which will, either through the spring 37 or contact of 35′ with 60, raise the main valve sufficiently for drainage of the entire valve casing, including said upper chamber 26 through the opening 29. Should the main valve not be raised through the compression of the spring 37 and require to be opened by the contact of member 35' with the shoulder 60, said valve 35 will be at this time tilted so that water may fall down past it through the opening 29. In order to facilitate such drainage of the upper chamber when the inlet pipe is so closed, the interior of the opening 29 at its lower end and the member 35' may be slitted, as shown in Figure 2.

I claim:

1. A flush valve device comprising a casing having liquid thoroughfare, a main valve to control said thoroughfare, an auxiliary valve to control the main valve and provided with a stem, an actuator for the auxiliary valve, including a lifter device below the auxiliary valve stem, said auxiliary valve stem being provided with spaced legs adapted for interchangeable engagement with the lifter device, and said legs being so constructed that the auxiliary valve will be lifted variable distances, depending upon which leg has contact with said lifter device for a given movement of the lifter.

2. A flush valve device comprising a casing having liquid thoroughfare, a main valve to control said thoroughfare, an auxiliary valve to control the main valve and provided with a stem, an actuator for the auxiliary valve, including a lifter device below the auxiliary valve stem, said auxiliary valve stem being provided with spaced legs adapted for interchangeable engagement with the lifter device, one of said legs being formed with a foot extending laterally therefrom for contact with said lifter device.

In witness whereof I claim the foregoing as my invention, I hereunto append my signature this 15 day of April, 1922.

EDWARD L. KELLAN.